Aug. 9, 1932.  W. N. BOOTH  1,871,144
VEHICLE WHEEL
Filed July 18, 1927   2 Sheets-Sheet 1
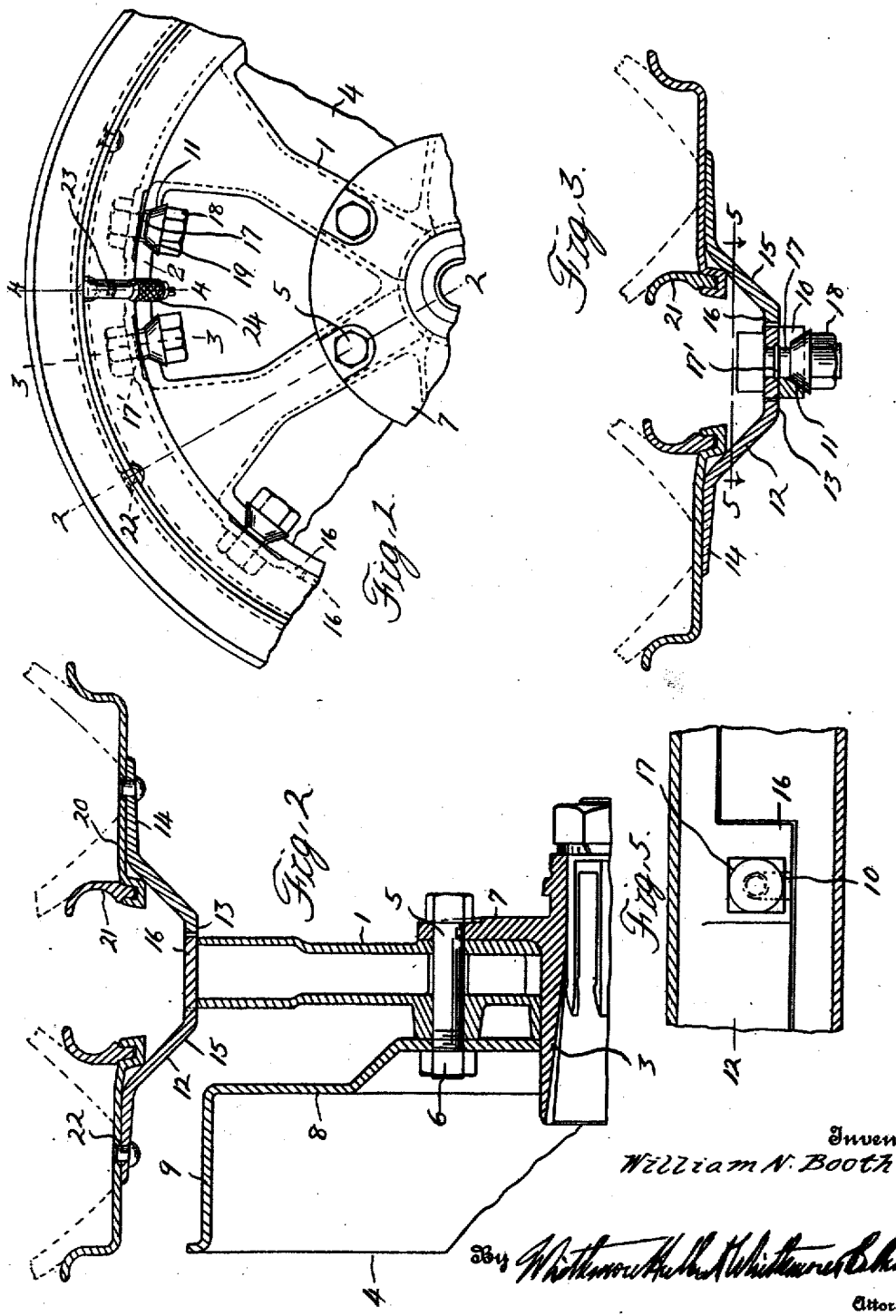
Inventor
William N. Booth

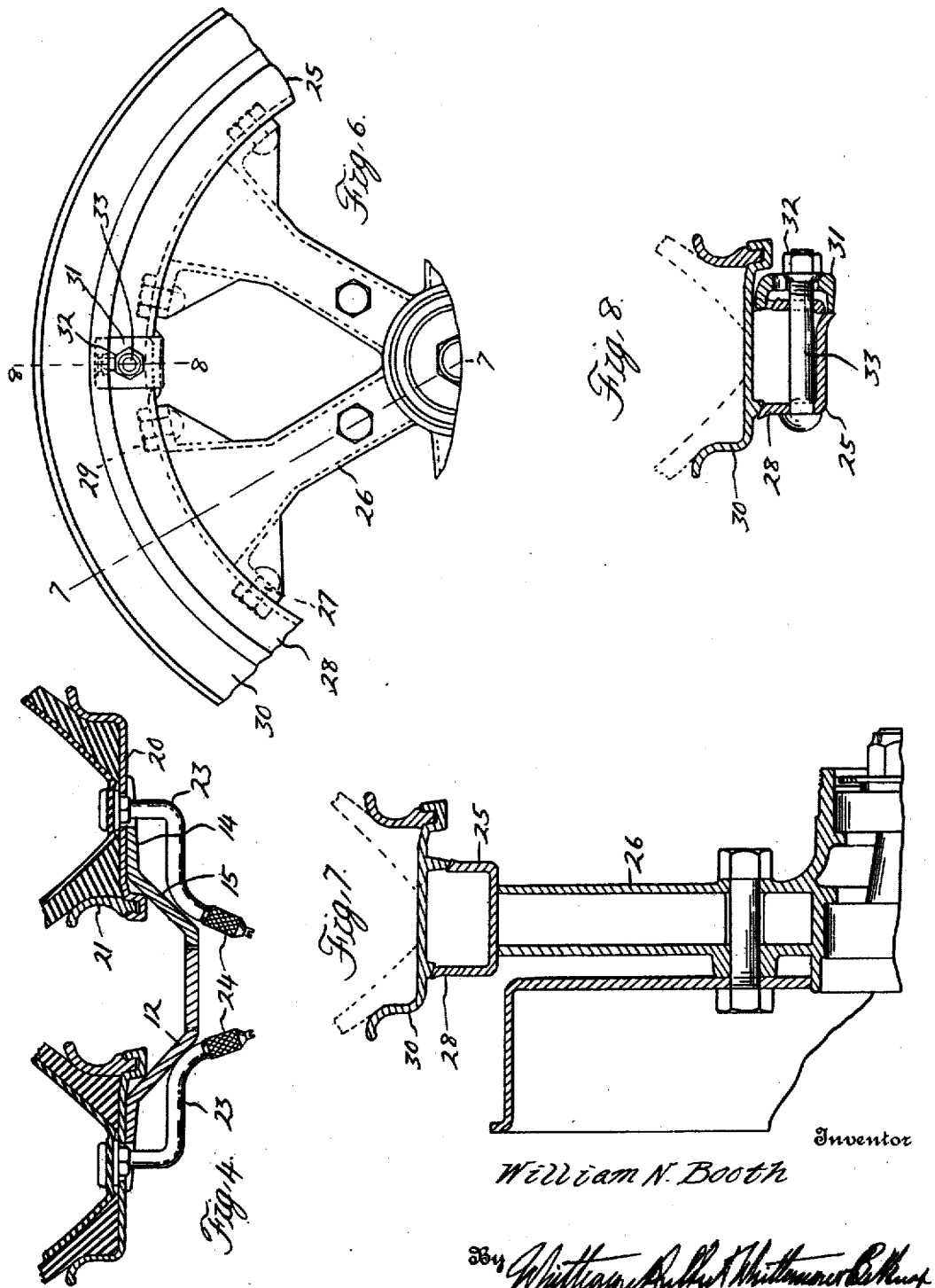

Patented Aug. 9, 1932

1,871,144

UNITED STATES PATENT OFFICE

WILLIAM N. BOOTH, OF DETROIT, MICHIGAN, ASSIGNOR TO KELSEY-HAYES WHEEL CORPORATION, OF DETROIT, MICHIGAN, A CORPORATION OF NEW YORK

VEHICLE WHEEL

Application filed July 18, 1927. Serial No. 206,755.

The invention relates to vehicle wheels and is particularly applicable to vehicle wheels of motor trucks, buses and the like. One of the objects of the invention is to so construct the wheel that single or dual tires may be mounted upon the same wheel body member. Another object is to so construct the wheel that the dual tires may be readily removed from the wheel body member. Further objects of the invention reside in the novel features of construction and combinations and arrangements of parts as more fully hereinafter set forth.

In the drawings:—

Figure 1 is a front elevation of a portion of a vehicle wheel embodying my invention;

Figures 2, 3 and 4 are cross sections, respectively, on the lines 2—2, 3—3 and 4—4 of Figure 1;

Figure 5 is a section on the line 5—5 of Figure 3;

Figure 6 is a front elevation, showing a modification;

Figures 7 and 8 are cross sections, respectively, on the lines 7—7 and 8—8 of Figure 6.

The vehicle wheel has the series of radially outwardly extending hollow spokes 1 and the peripherally extending rim portions 2 forming the rim and located at the outer ends of and preferably cast integral with the spokes, these spokes and rim forming the body of the wheel which is mounted upon the hub 3 of the wheel. The wheel illustrated in Figures 1 to 5, inclusive, is a rear wheel and has the brake drum 4 which is secured to the inboard side of the wheel body by the bolts 5 and nuts 6, which also secure the wheel body to the fixed flange 7 of the wheel hub. This brake drum has the axially outer portion 8 of its web laterally offset axially rearwardly from the wheel body to properly position its brake flange 9.

To provide for inter-changeably mounting upon the same wheel body either a single tire or dual tires and at the same time to provide a strong connection, I have formed in the rim portions 2 and adjacent each spoke the transverse slots 10 having open ends at the axially front edge of the rim portions and also having tapered seats 11 in their radially inner faces with the axes of the seats in the median plane of the rim portions. I have also provided the corresponding demountable fellies or adapters 12, each of which is preferably formed from a flat sheet metal blank and has the radially inner and outer laterally offset portions 13 and 14, respectively, and the intermediate connecting portion 15, the latter being preferably inclined. The radially inner portions 13 are provided with interengaging tongues 16 which together encircle the rim portions 2 and are adapted to engage their radially outer faces. For detachably securing the fellies to the wheel body, I have provided the bolts 17 which extend radially through the tongues 16 and the transverse slots 10 of the rim portions, and the nuts 18 threaded upon the radially inner ends of the bolts and having tapered end faces 19 for engaging the tapered seats 11. The tongues 16 each have a length sufficient to receive the bolts upon opposite sides of the alternate spokes and as a result provide sufficient strength to withstand the stresses to which they are subjected. The bolts 17 are preferably secured permanently to the fellies as by shearing the bolts to form the shoulders 17' engaging the radially inner faces of the tongues, the bolt heads engaging the radially outer faces.

20 are corresponding tire carrying rims which, as shown, are of the solid base type and have quick detachable tire retaining flanges 21. These tire carrying rims are mounted upon the radially outer portions 14 of the fellies and are permanently secured thereto as by means of the rivets 22, which extend through the bases of the tire carrying rims, the latter being secured to the fellies with their adjacent tire retaining flanges near the median plane of the wheel, but sufficiently spaced apart so that the pneumatic tires will not contact while in use.

23 are corresponding valve stems for the pneumatic tires, each extending through the base of its rim 20 and being angled to position its cap 24 near the median plane of the wheel and between adjacent spokes so that either tire may be readily inflated. With this arrangement of valve stem, it will be seen that the valve stem for the inboard tire extends between the brake drum and the inboard felly.

From the above description, it will be seen that both of the fellies may be readily removed from the wheel body by loosening the nuts 18 and then withdrawing the fellies in a laterally outward direction, at which time the bolts slide through the transverse slots in the rim portions. Also, after the outboard felly has been removed, the tire carried by the rim upon this felly, may be readily removed or the tire carried by the rim upon the inboard felly may be readily removed without the necessity of removing the latter felly.

Figures 6, 7 and 8 illustrate a modified construction of wheel, in which the felly 25 and hollow spokes 26 form a wheel body corresponding to that previously described. The circumferentially extending projections on the outer ends of the spokes are also provided with transverse slots corresponding to those in the wheel rim portions of the modification previously described and are detachably engageable by the bolts 27 which extend radially through the base of the channel-shaped metallic felly 28, nuts 29 being threaded upon the bolts to clamp the felly to the rim portions. The axially outer and axially inner flanges of this felly have flared seats at their radially outer edges, which are engageable by beads upon the demountable tire carrying rim 30. The demountable rim may be secured upon the felly by means of suitable clamps 31 which may be forced axially inwardly by the nuts 32 upon the bolts 33 extending transversely through the felly.

From the above description, it will be seen that I have provided a construction of wheel in which the wheel body is adapted to alternatively carry a single tire or dual tires. It will also be seen that the fellies carrying the tire carrying rims may be readily removed or applied to the wheel body.

What I claim as my invention is:

1. In a vehicle wheel, the combination with a wheel body member, of a pair of demountable fellies having radially inner and outer portions with the radially inner portions inter-engaging and the radially outer portions spaced from each other, and means extending radially through said radially inner portions for detachably securing said fellies to said wheel body member.

2. In a vehicle wheel, the combination with a wheel body member including spokes and wheel rim portions at the outer ends of and integral with said spokes, said rim portions having transverse slots, a pair of demountable fellies each having radially outer and radially inner and outer portions, said radially inner portions inter-engaging, and means extending through said inter-engaging portions for detachably securing said fellies to said wheel rim portions.

3. In a vehicle wheel, the combination with a wheel body member of a pair of demountable rim members having radially inner and outer portions with the outer portions spaced from each other and the radially inner portions inter-engaging and extending at substantially right angles to the plane of rotation of the wheel, and means for detachably securing the said radially inner portions to the wheel body.

4. In a vehicle wheel, the combination with a wheel body member, of a pair of demountable rim members having spaced radially outer tire supporting portions, said rim members being provided with laterally extending inter-engaging portions spaced inwardly from the tire supporting portions aforesaid and arranged substantially parallel thereto, and means for detachably securing the rim members to the wheel body.

In testimony whereof I affix my signature.

WILLIAM N. BOOTH.